US010384516B2

United States Patent
Chung et al.

(10) Patent No.: US 10,384,516 B2
(45) Date of Patent: Aug. 20, 2019

(54) VENTILATION NOZZLE ARRANGEMENT FOR A COCKPIT OF A VEHICLE AND VEHICLE COMPRISING THE VENTILATION NOZZLE ARRANGEMENT

(71) Applicant: GM GLOBAL TECHNOLOGY OPERATIONS LLC, Detroit, MI (US)

(72) Inventors: Dae Hyun Chung, Ruesselsheim (DE); Younghee Choi, Ruesselsheim (DE); Junho Park, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 154 days.

(21) Appl. No.: 15/399,226

(22) Filed: Jan. 5, 2017

(65) Prior Publication Data

US 2017/0190241 A1  Jul. 6, 2017

(30) Foreign Application Priority Data

Jan. 6, 2016 (DE) ........................ 10 2016 000 067

(51) Int. Cl.
  *B60H 1/34* (2006.01)
  *B60Q 3/62* (2017.01)
  *B60K 37/04* (2006.01)
(52) U.S. Cl.
  CPC ........... *B60H 1/3407* (2013.01); *B60K 37/04* (2013.01); *B60Q 3/62* (2017.02)
(58) Field of Classification Search
  CPC .................................................. B60H 1/3407

USPC .................................................. 454/152–155
See application file for complete search history.

(56) References Cited

U.S. PATENT DOCUMENTS

| 2006/0133920 | A1* | 6/2006 | Chen ................... F04D 25/0613 415/76 |
| 2008/0136671 | A1* | 6/2008 | Shen ...................... G08G 1/096 340/907 |
| 2010/0093267 | A1* | 4/2010 | Hogh ....................... B60H 1/34 454/76 |
| 2010/0104461 | A1* | 4/2010 | Smith ................... F04D 25/088 417/423.1 |

FOREIGN PATENT DOCUMENTS

| DE | 4443817 C1 | 12/1995 |
| EP | 1832452 A2 | 9/2007 |
| WO | 2015106778 A1 | 7/2015 |

OTHER PUBLICATIONS

German Patent Office, German Search Report for German Application No. 102016000067.8, dated Jul. 5, 2016.
Jonathan Raimondo, Stay Cool With the Desktop LED Clock Fan, Jul. 19, 2015, http://digitalfang.com/stay-cool-with-the-desktop-led-clock-fan/.

* cited by examiner

*Primary Examiner* — Vivek K Shirsat
(74) *Attorney, Agent, or Firm* — Lorenz & Kopf, LLP

(57) ABSTRACT

A ventilation nozzle arrangement for a cockpit of a vehicle includes a ventilation nozzle for ventilating the vehicle by an airflow and plurality of fins between which the airflow can escape and/or escapes in a ventilation direction. The fins consist of a light-permeable material.

15 Claims, 4 Drawing Sheets

VENTILATION NOZZLE ARRANGEMENT FOR A COCKPIT OF A VEHICLE AND VEHICLE COMPRISING THE VENTILATION NOZZLE ARRANGEMENT

CROSS-REFERENCE TO RELATED APPLICATION

This application claims priority to German Patent Application No. 102016000067.8 filed Jan. 6, 2016, which is incorporated herein by reference in its entirety.

TECHNICAL FIELD

The present disclosure pertains to a ventilation nozzle arrangement for a cockpit of a vehicle and to a vehicle including the ventilation nozzle arrangement.

BACKGROUND

In many vehicles, at least one ventilation nozzle is integrated in a cockpit of the vehicle for outputting a ventilation flow into a vehicle interior. Ventilation nozzles, which, in addition to the ventilation function, also have a time display function, are known. For example, WO 2015 106 778 describes an analog clock, which is integrated in a ventilation nozzle of a vehicle.

SUMMARY

The present disclosure provides a functionally improved ventilation nozzle arrangement. A ventilation nozzle arrangement for a cockpit, for example a control panel and/or a dashboard of a vehicle is disclosed. For example, the vehicle is embodied as a passenger car or a truck. The ventilation nozzle arrangement includes a ventilation nozzle, which is embodied for the ventilation of a vehicle interior, in particular for heating, cooling and/or dispensing a fragrance in the interior of the vehicle by an airflow. The ventilation nozzle includes a plurality of fins, between which the airflow can escape and/or escapes in a ventilation direction, preferably into the interior of the vehicle.

The fins include a light-permeable material. For example, the fins include a transparent and/or translucent plastic. In response to an illumination of the fins, it is thus possible for light to shine through them. Preferably, the light can shine through the spaces of the fins and through the fins themselves. In addition to the ventilation function of the ventilation nozzle, an illuminating function can thus be implemented as well. It is possible in the context of the present disclosure for the fins to be capable of being illuminated in different colors from behind. The ventilation nozzle can in particular be illuminated in an adjustable light color and/or can change the light color automatically. A multifunction in the ventilation nozzle can thus be implemented in an advantageous manner, whereby installation space and costs can be saved. A comfortable ambience can furthermore be created in the vehicle by the illumination of the ventilation nozzle, in particular of the fins.

In a preferred embodiment of the present disclosure, the fins are arranged radially around a common center. The common center is formed by an axle or shaft. For example, the fins are preferably arranged relative to one another around the common center in intermediate angles of 30 degrees. Alternatively or additionally, the ventilation nozzle includes exactly twelve fins. The twelve fins are thus arranged in such a way that they correspond to a time display including twelve hour units and/or including twelve five-minute units. In particular, a first one of the fins is arranged at 360 degrees and stands vertically on the common center. Optionally in addition, a seventh fin is arranged as extension of the first fin and also vertically. The seventh fin is thus arranged at 180 degrees. In particular, the first fin points towards twelve o'clock and the seventh fin points to six o'clock of the time display. The remaining ten fins then point to a corresponding hour position, i.e., one o'clock, two o'clock, three o'clock, four o'clock, five o'clock, seven o'clock, eight o'clock, nine o'clock, ten o'clock and eleven o'clock clockwise in succession and/or they are aligned and/or arranged accordingly.

A preferred embodiment of the present disclosure provides for the ventilation nozzle arrangement to include at least one illuminating device. The illuminating device is preferably embodied to illuminate at least one of the fins. The at least one fin can in particular be illuminated holohedrally. It is preferred, however, for visible edges of the at least one fin, which are directed towards an interior of the vehicle to be illuminated and/or to be capable of being illuminated. For example, the at least one illuminating device illuminates the at least one fin from the outside, the latter is in particular illuminated from a surrounding area of the fin and/or of the ventilation nozzle. In the alternative, it is possible for the at least one illuminating device to be integrated in the at least one fin.

It is furthermore possible in the context of the present disclosure for the at least one fin or a part of the fin to act as light guide. In this case, light is fed into the fin or into the part thereof. The illuminating device preferably includes twelve light-emitting diode pairs for this purpose, wherein one of the light-emitting diode pairs is in each case assigned to a fin or to the part thereof. In particular, the respective light-emitting diode pair feeds the light into the corresponding fin or into the part thereof. It is also possible for the light-emitting diodes of a light-emitting diode pair to alternately feed the light into the fin or into the part thereof. In the alternative or optionally in addition, the fin or the part thereof can emit the light completely or in sections.

In a particularly preferred implementation of the present disclosure, a time is displayed on the ventilation nozzle and/or can be displayed thereon by the illumination of at least one of the fins, preferably of at least two of the twelve fins. The ventilation nozzle acts as a time display. For example, the first and seventh fin is illuminated to display the time 12:30 o'clock or 00:30 o'clock. The first fin thus forms an hour hand, which points to 12:00 o'clock or 00:00 o'clock. In this case, the seventh fin in particular forms a minute hand, which is positioned at "half past." It is also possible in the context of the present disclosure for a further fin to be illuminated and/or to be capable of being illuminated by the illuminating device. As seconds hand in this case, the illuminating device displays a five-second cycle, so that the illumination changes from the further fin to the subsequent fin every five seconds.

In a preferred configuration of the present disclosure, the at least one illuminating device has a first light-emitting diode ring and a second light-emitting diode ring. For example, the first and second light-emitting diode ring is embodied in a circular and/or circular ring-shaped manner.

In a preferred structural implementation of the present disclosure, the fins are accommodated in the first light-emitting diode ring, the first light-emitting diode ring in particular surrounds the fins. For example, the first light-emitting diode ring forms a circular ring-shaped frame for the fins. The second light-emitting diode ring is preferably arranged on the or in the common center of the fins. In the alternative, the second light-emitting diode ring forms the common center of the fins or covers it in a hood-like manner.

In a preferred embodiment of the present disclosure, the first light-emitting diode ring includes a plurality of light-emitting diodes and the second light-emitting diode ring includes a plurality of further light-emitting diodes. The plurality of light-emitting diodes of the first light-emitting diode ring and the plurality of further light-emitting diodes of the second light-emitting diode ring are preferably arranged coaxially to the common center of the fins. It is particularly preferred for the plurality of light-emitting diodes and for the plurality of further light-emitting diodes to have exactly twelve light-emitting diodes in each case. The exactly twelve light-emitting diodes are in each case preferably arranged relative to one another around the common center at an angle of 30 degrees. It is thus made possible for each of the twelve light-emitting diodes of the first light-emitting diode ring and for each of the twelve further light-emitting diodes of the second light-emitting diode ring to be assigned to exactly one of the twelve fins in each case.

It is particularly preferred in the context of the present disclosure for the first light-emitting diode ring to have a larger radius than the second light-emitting diode ring. The larger radius of the first light-emitting diode ring is preferably equal or similar to a total length of one of the fins, which has the fins, starting at the common center all the way to the outer end thereof. The radius of the second light-emitting diode ring is in particular maximally 50 percent, preferably maximally 40 percent, in particular maximally 30 percent of the radius of the first light-emitting diode ring and/or of the total length of one of the fins.

It is particularly preferred for at least one of the twelve light-emitting diodes of the first light-emitting diode ring to illuminate at least one of the twelve fins completely or virtually completely, e.g. by at least 80 percent, preferably by at least 90 percent of the total length of the fin, which is to be illuminated. For example, the light-emitting diodes of the first light-emitting diode ring emit their light in the direction of the outer end of the respectively assigned fin and/or they feed their light into the respectively assigned fin at the outer end thereof. Due to the complete or virtually complete illumination of the corresponding fin, the latter forms a long hand, in particular the minute hand and optionally in addition the seconds hand, of the time display. In particular a time can be displayed in a five-minute cycle and optionally in addition in a five-second cycle, by the minute hand and optionally in addition by the seconds hand.

Optionally in addition, at least one of the twelve further light-emitting diodes of the second light-emitting diode ring illuminates one of the twelve fins in sections. For example, the further light-emitting diodes of the second light-emitting diode ring emit their light on the common center of the fins and/or the further light-emitting diodes feed their light from the center into the respectively assigned fin. Due to the illumination of the corresponding fin in sections, in particular from the center, the fin forms a short hand, in particular the hour hand, of the time display.

In the alternative, it is possible in the context of the present disclosure for the at least one of the twelve light-emitting diodes of the first light-emitting diode ring to illuminate at least one of the twelve fins in sections, in particular on the outer end of the respectively assigned fin. In this case, each of the light-emitting diodes of the first light-emitting diode ring illuminates the total length of the respectively assigned fin, starting at the outer end, by at least 30 percent, preferably by at least 40 percent and in particular by at least 50 percent. To form the long hand, in particular the minute and/or seconds hand, the illumination of the first light-emitting diode ring in sections is supplemented by an additional illumination in sections, in particular on the common center. This illumination in sections, which starts at the center, is created by the at least one further light-emitting diode of the second light-emitting diode ring. Due to the optical assembling of the two illuminations of the same fin in sections, the long hand can be perceived optically. The fin, which is illuminated from both sides in sections, then forms in particular the minute hand and optionally in addition the seconds hand.

In a preferred embodiment of the present disclosure, the ventilation nozzle arrangement has a control device, which is embodied for controlling the at least one illuminating device. The control device is preferably embodied to independently control the plurality of light-emitting diodes of the first light-emitting diode ring and the plurality of the further light-emitting diodes of the second light-emitting diode ring. The control device in particular controls exactly one of the twelve light-emitting diodes of the first light-emitting diode ring to illuminate exactly one of the twelve fins in accordance with the time, in particular completely or virtually completely, in such a way that the minute hand is formed by the illuminated fin. It is particularly preferred for the control device to control the illumination of the fin in such a way that the illumination changes to the subsequent fin in a five-minute cycle, in particular in that a switch is made from one light-emitting diode to the subsequent light-emitting diode.

Optionally in addition, the control device controls the twelve light-emitting diodes of the first light-emitting diode ring to illuminate individual fins subsequently in such a way that the seconds hand is formed through this. It is particularly preferred for the control device to control the illumination of the fin in such a way that the illumination changes to the subsequent fin in a five-second cycle, in particular in that a switch is made from one light-emitting diode to the subsequent light-emitting diode.

In the alternative, it is possible in the context of the present disclosure for the control device in the case of a respective illumination of the fins in section by the light-emitting diode of the first light-emitting diode ring and in the case of the respective illumination of the fins in section by the further light-emitting diode of the second light-emitting diode ring, to control both light-emitting diode rings to jointly illuminate exactly one of the twelve fins of the time accordingly in such a way that the complete or virtually complete illumination takes place by the joint illumination in section and that the long hand can thus be perceived. The latter then forms in particular the minute hand and optionally in addition the seconds hand.

Optionally in addition, the control device controls exactly one of the further twelve light-emitting diodes of the second light-emitting diode ring to illuminate exactly one of the twelve fins, in particular in sections, in such a way that the hour hand is formed by the illuminated fin. It is particularly preferred for the control device to control the illumination of the fin in such a way that the illumination changes to the subsequent fin in an hour cycle, in particular in that a switch is made from one light-emitting diode to the subsequent further light-emitting diode.

BRIEF DESCRIPTION OF THE DRAWINGS

The present disclosure will hereinafter be described in conjunction with the following drawing figures, wherein like numerals denote like elements.

DETAILED DESCRIPTION

Figure 1:
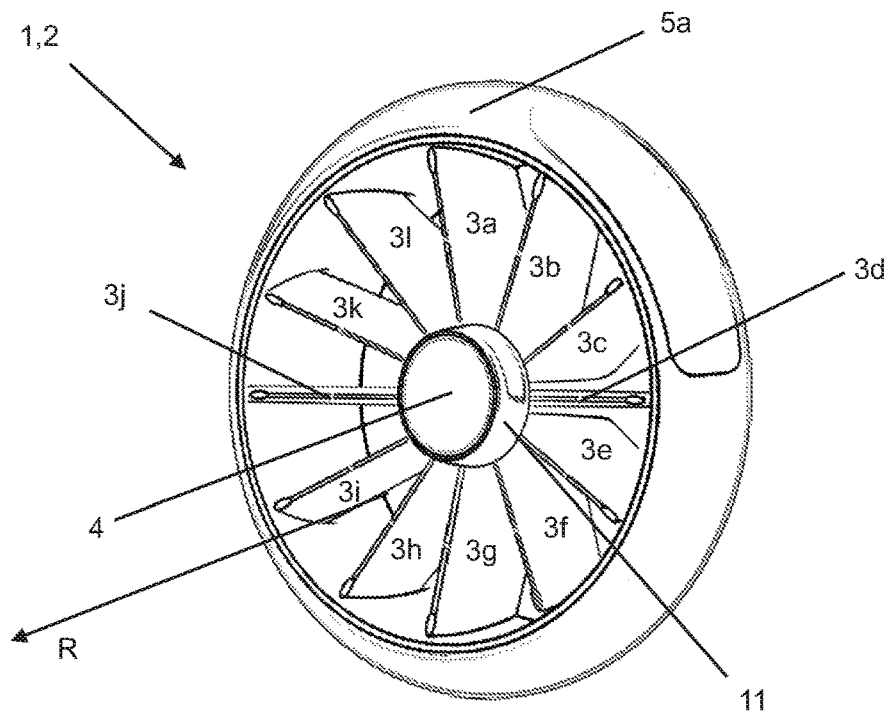
FIG. 1 shows a perspective view of a ventilation nozzle arrangement including a ventilation nozzle.

The following detailed description is merely exemplary in nature and is not intended to limit the invention or the application and uses of the invention. Furthermore, there is no intention to be bound by any theory presented in the preceding background of the invention or the following detailed description. Parts, which correspond to one another or which are identical, are in each case provided with the same reference numerals in the figures.

Figure 4:
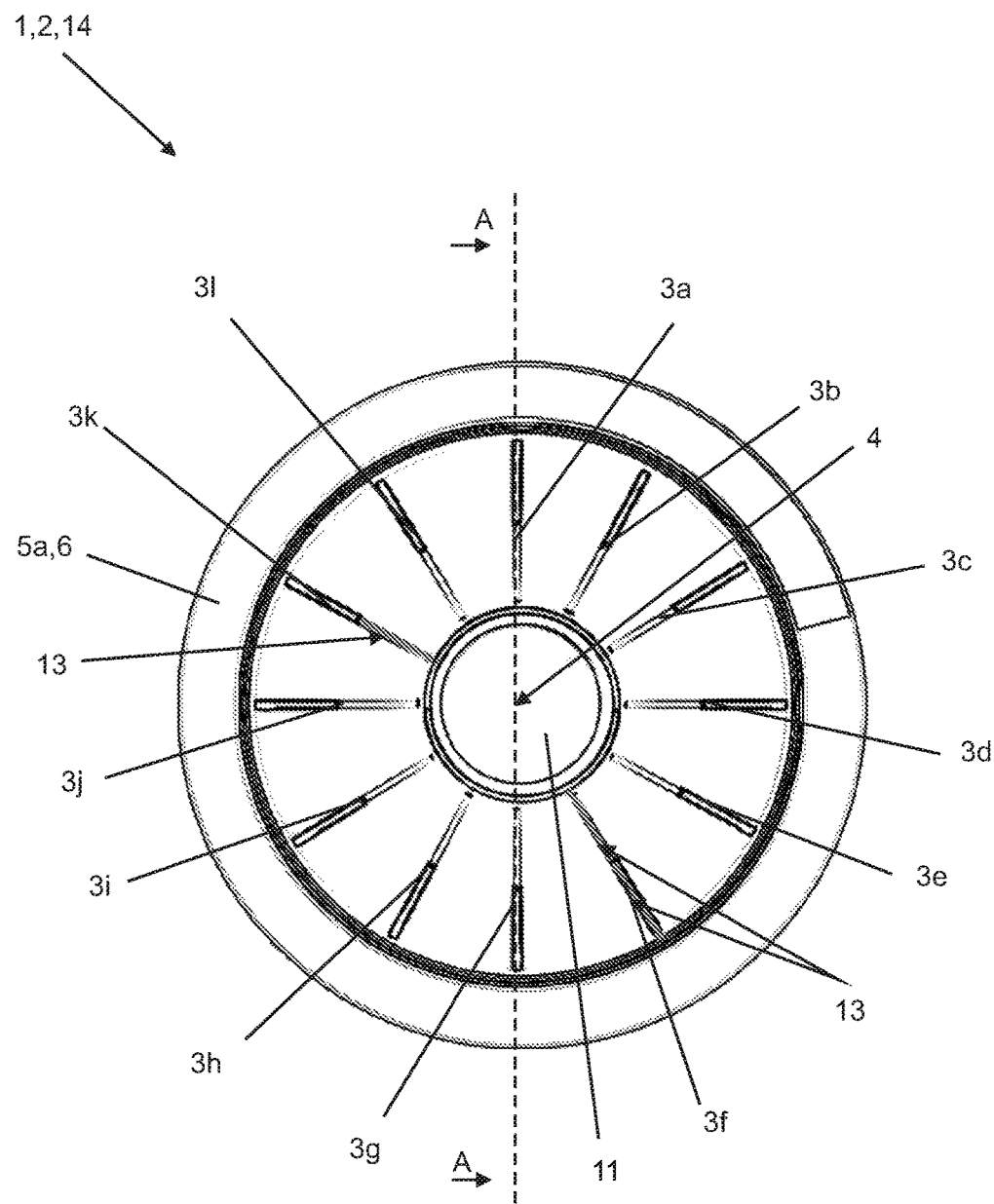
FIG. 4 shows the ventilation nozzle arrangement from FIG. 1 in a top view from the front.

FIG. 1 shows a perspective top view from the front one a ventilation nozzle arrangement 1. The ventilation nozzle arrangement 1 is embodied for integration into a cockpit of a vehicle. FIG. 4 shows a top view from the front onto the ventilation nozzle arrangement 1. The ventilation nozzle arrangement 1 has a ventilation nozzle 2 including twelve fins 3a-3l. It is embodied in a circular and/or circular ring-shaped manner. Air for ventilation, for heating, for cooling and/or for dispensing a fragrance, can flow through the spaces between the fins 3a-3l into a vehicle interior in a ventilation direction R.

As is shown in FIG. 1 and in more detail in FIG. 4, the fins 3a-3l are in each case arranged radially around a common center 4 in intermediate angles of 30 degrees around the common center 4. A first fin 3a is arranged vertically to the common center 4 and is positioned at 360 degrees. A seventh fin 3g is also arranged vertically to the common center 4 as an extension of the first fin 3a and is positioned at 180 degrees. A fourth fin 3d is arranged horizontally to the common center 4 and is positioned at 90 degrees. A tenth fin 3j is arranged as an extension of the fourth fin 3d. The tenth fin 3d is also arranged horizontally to the common center 4 and is positioned at 270 degrees. A second and third fin 3b, 3c are arranged clockwise between the first and fourth fin 3a, 3d. A fifth and sixth fin 3e, 3f are arranged clockwise between the fourth and seventh fin 3d, 3g. An eighth and ninth fin 3h, 3i are arranged clockwise between the seventh and tenth fin 3a, 3j. And an eleventh and twelfth fin 3k, 3l are arranged clockwise between the tenth and first fin 3j, 3a. A time display 14 is provided by the arrangement and positioning of the twelve fins 3a-3l. For example, the first fin 3a is at 12 o'clock or 0 o'clock, respectively, and the seventh fin is at 6 o'clock or 18 o'clock, respectively.

Figure 2:
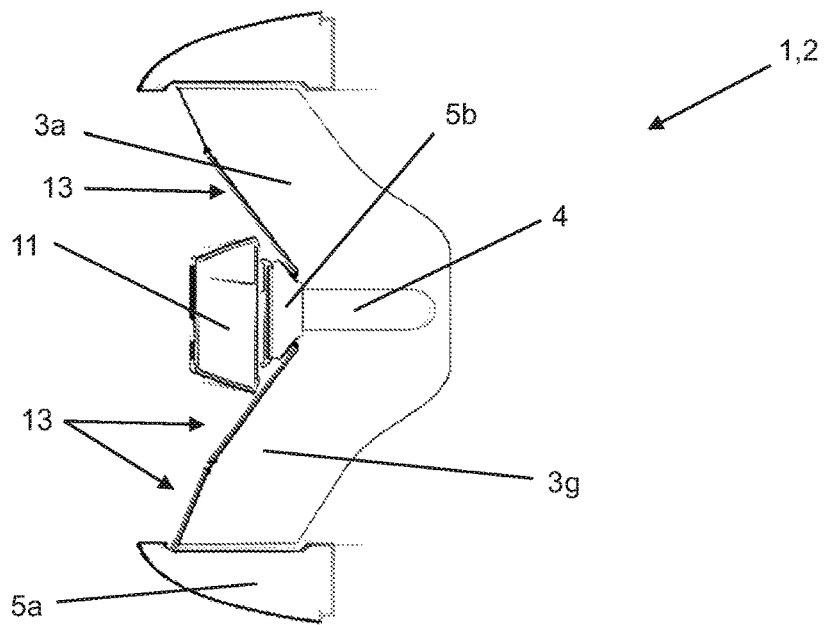
FIG. 2 shows the ventilation nozzle arrangement from FIG. 1 in a sectional view, wherein a sectional line runs vertically through a center of the ventilation nozzle.

In FIG. 2, the ventilation nozzle arrangement 1 is shown in a sectional view along the sectional line A-A through the ventilation nozzle arrangement 1 from FIG. 4. The common center 4 is formed by a shaft. An operating device 11, which is embodied for the manual closing of the ventilation nozzle 2 by activating a movable cover 12 (FIG. 2), is arranged on the common center 4. The movable cover 12 is operatively connected to the operating device 11 via the shaft.

The ventilation nozzle arrangement 1 has a first and second illuminating device 5a, 5b. The two illuminating devices 5a, 5b are embodied for the illumination of the ventilation nozzle 2, in particular of the twelve fins 3a-l. The illuminating devices 5a, 5b illuminate the fins 3a-l from the outside, in particular from a surrounding area of the fins 3a-3l. It is possible in an alternative exemplary embodiment for the illuminating devices 5a, 5b to be integrated in the fins 3a-l and/or for the fins 3a-e to act as light guides.

The fins 3a-l consist of a light-permeable, in particular transparent or translucent plastic material, so that the light created by the illuminating devices 5a, 5b can shine through the fins 3a-3l. The fins 3a-3l can in particular be illuminated completely or partially. According to FIG. 2, a visible edge 13 of the fin 3a is illuminated partially and a front visible edge 13 of the fin 3g is illuminated completely or virtually completely. The light emitted by the fins 3a, 3g is thus visible in the interior of the vehicle.

Figure 3:
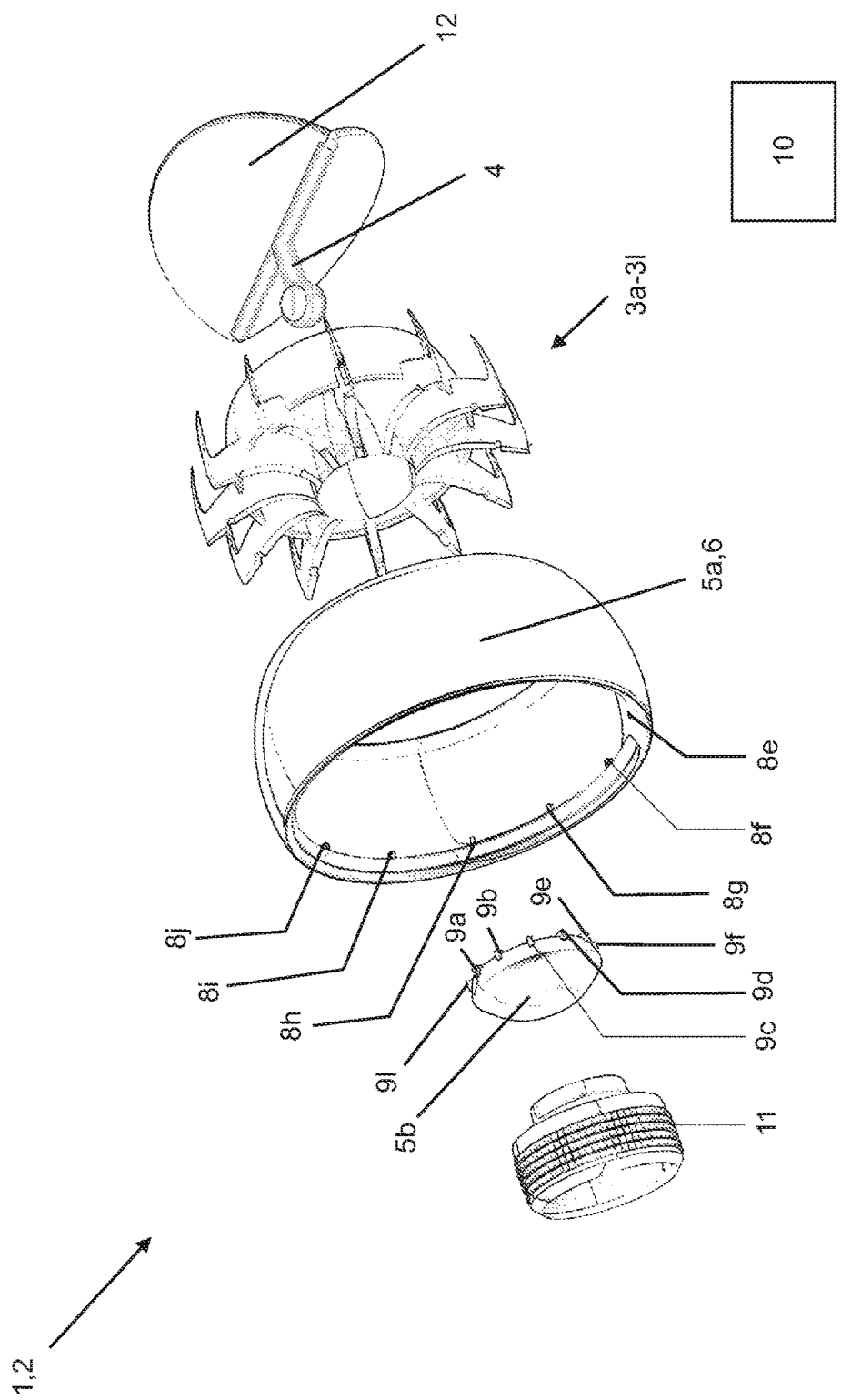
FIG. 3 shows the ventilation nozzle arrangement from FIG. 1 in an exploded illustration.

FIG. 3 shows the ventilation nozzle arrangement 1 from FIG. 1 in an exploded illustration. The ventilation nozzle arrangement 1 includes the operating device 11, the cover 12, the common center 4, the twelve fins 3a-l and the two illuminating devices 5a, 5b.

The first illuminating device 5a is embodied as a first light-emitting diode ring 6. The first light-emitting diode ring 6, 7 is embodied in a circular ring-shaped manner and can be arranged and/or is arranged coaxially around the common center of the fins 3a-l. The first light-emitting diode ring 6 has a radius, which is equal or similar to a total length of one of the fins 3a-3l, in particular in longitudinal extension of the fins 3a-3l, from the common center 4 to an outer end of the fins 3a-3l. As shown in FIG. 4, the first light-emitting diode ring 6 surrounds the fins 3a-3l completely and forms a circular ring-shaped frame around the fins 3a-3l.

The first light-emitting diode ring 6 has a plurality of light-emitting diodes 8a-8l, in particular exactly twelve light-emitting diodes 8a-8l. The light-emitting diodes 8a-8l are arranged radially around the common center 4 with an intermediate angle of 30 degrees in each case. One of the light-emitting diodes 8a-8l is thus in each case assigned to a corresponding fin 3a-3l.

The second illuminating device 5b is embodied as a second light-emitting diode ring 7. The second light-emitting diode ring 7 is embodied in a circular ring-shaped manner and is arranged and/or can be arranged radially around the common center 4. It forms a circular ring-shaped hood, which is arranged on the inner ends of the fins 3a-3l directed towards the center 4, and which covers the center 4 towards the interior of the vehicle. The second light-emitting diode ring 7 has a radius, which is smaller than the radius of the first light-emitting diode ring 6.

The second light-emitting diode ring 6 has a plurality of further light-emitting diodes 9a-9l, in particular exactly twelve further light-emitting diodes 9a-9l. The further light-emitting diodes 9a-9l are arranged and/or can in each case be arranged radially around the common center 4 with an intermediate angle of 30 degrees. One of the further light-emitting diodes 9a-9l is thus in each case assigned and/or can be assigned to a corresponding fin 3a-3l.

Each fin 3a-3l can thus be illuminated by a light-emitting diode 8a-8l of the first light-emitting diode ring 6 and additionally by a further light-emitting diode 9a-9l of the second light-emitting diode ring 7. The light-emitting diodes 8a-8l of the first and/or second light-emitting diode ring 6 illuminate the visible edge 13 of the respective fin 3a-3l in sections, in particular by maximally 30 percent, preferably by maximally 40 percent and in particular by maximally 50 percent. It is possible in another exemplary embodiment for the light-emitting diodes 8a-8l of the first light-emitting diode ring 6 to illuminate the visible edge 13 of the respective fin 3a-3l virtually completely or completely, in particular by at least 80 percent, preferably by at least 90 percent. However, the further light-emitting diodes 9a-9l of the second light-emitting diode ring 7 illuminate the visible edge 13 of the respective fins 3a-3l only in sections, in particular starting from the center, preferably by maximally 50 percent, preferably by maximally 40 percent, specifically by maximally 30 percent, of the total length of the fin 3a-3l.

To control the illuminating devices 5a, 5b, in particular of the two light-emitting diode rings 6, 7 and the light-emitting diodes 8a-8l, 9a-9l thereof, the ventilation nozzle arrangement 1 has a control device 10. The control device 10 is in particular embodied for the independent control of the light-emitting diodes 8a-8l of the first light-emitting diode ring 6 and the further light-emitting diodes 9a-9l of the second light-emitting diode ring 7, so that a time is thus displayed via at least two fins 3a-3l, which are illuminated by the light-emitting diodes 8a-8l, 9a-9l.

The control device in particular controls one of the twelve light-emitting diodes 8a-l of the first light-emitting diode ring 6 and one of the light-emitting diodes 9a-9l of the second light-emitting diode ring 7 to jointly illuminate a fin 3a-l, which is assigned to the light-emitting diodes, in such a way that a long hand, in particular a minute hand of a five-minute cycle of the time display, is formed by the illuminated fin 3a-l. The corresponding fin 3a-3l is hereby in each case illuminated in part by the light-emitting diode 8a-8l of the first light-emitting diode ring 6 and the remaining part is illuminated by the further light-emitting diode 9a-9l of the second light-emitting diode ring 7, so that the joint illumination as a whole can be perceived as long hand, in particular as minute hand. In the alternative, it is possible for only one light-emitting diode 8a-8l of the first light-emitting diode ring 6 to illuminate the fin 3a-3l, which is assigned to it, completely, and for the long hand to thus be formed. The control takes place according to the current time, so that a fin 3a-3l, which follows clockwise, is in each case illuminated in a 5-minute cycle.

The control device 10 furthermore controls one of the further light-emitting diodes 9a-9l of the second light-emitting diode ring 7 to illuminate a fin 3a-3l, which is assigned thereto, in such a way that a short hand, in particular an hour hand of the time display, can be perceived by the illuminated fin 3a-l. For this purpose, the further light-emitting diode 9a-9l of the second light-emitting diode ring 7 illuminates the visible edge 13 of the corresponding fin 3a-3l in sections, e.g. by maximally 50 percent, preferably by maximally 40 percent, in particular by maximally 30 percent. The control takes place according to the current time, so that a fin 3a-3l, which follows clockwise, is in each case illuminated in a 5-minute cycle.

According to FIG. 4, the visible edge 13 of the sixth fin 3f is illuminated by the light-emitting diode 8f of the first light-emitting diode ring 6 and by the further light-emitting diode 9f of the second light-emitting diode ring 7. The further light-emitting diode 9f hereby illuminates the visible edge 13 from the center 4 and the light-emitting diode 8f from the outer end, so that both light-emitting diodes 8f, 9f in each case illuminate approximately half of the visible edge 13 and can thus be perceived as continuous, long hand, in particular as minute hand. The minute hand is positioned at "five minutes before half past".

Figure 5:
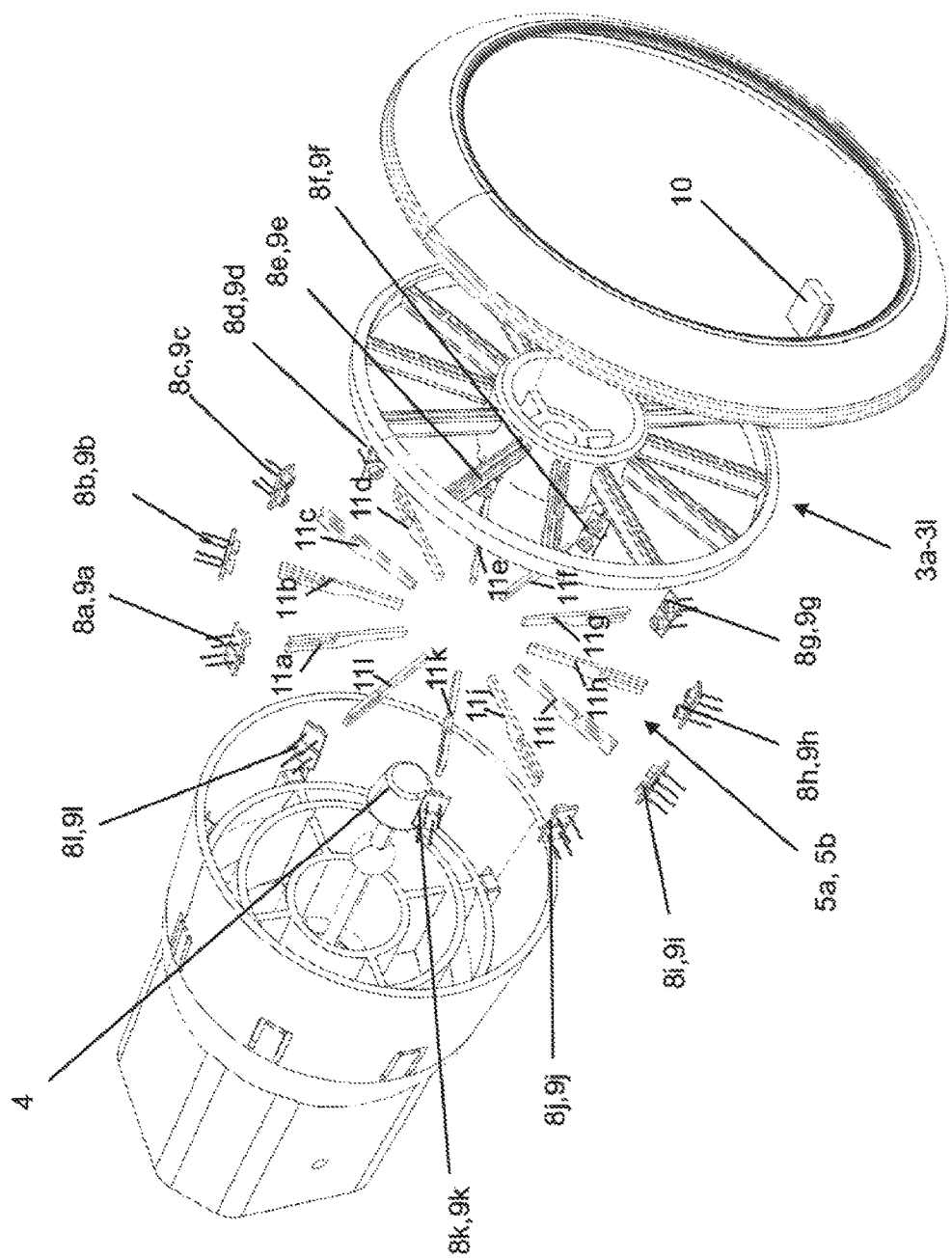
FIG. 5 shows an alternative ventilation nozzle arrangement including a ventilation nozzle in an exploded illustration.

The visible edge 13 of the eleventh fin 3k is illuminated in sections by the further light-emitting diode 9k. The further light-emitting diode 9k in particular illuminates the visible edge 13 from the center approximately to half of the total length. The visible edge 13 of the eleventh fin 3k can thus be perceived as short hand, in particular as hour hand. The hour hand is positioned at "ten". In combination with the minute hand, the time 10:25 o'clock or 22:25 o'clock is thus displayed on the time display 14. FIG. 5 shows an alternative ventilation nozzle arrangement including a ventilation nozzle in an exploded illustration. The illuminating device 5 includes a plurality of light guides 11a-11l, in particular twelve light guides. The light guides 11a-11l can be arranged on the fins 3a-3l and/or can be coupled thereto, so that, in the arranged and/or coupled state, they form a part of the fins 3a-3l.

The illuminating device 5 includes a plurality, in particular twelve, light-emitting diode pairs 8a-8l, 9a-9l. Each of the light-emitting diode pairs includes a first light-emitting diode 8a-8l and a second light-emitting diode 9a-9f One of the light-emitting diode pairs 8a-8l, 9a-9l is in each case assigned to a light guide 11a-11l for feeding in light. The light-emitting diode pairs 8a-8l 9a-9l are hereby arranged on the outer end of the corresponding light guide 11a, 11l. The light-emitting diode pairs 8a-8l, 9a-9l feed light into the respective light guide 11a-11l. This can take place alternately or simultaneously, according to the time to be displayed.

The light guide 11a-11l can emit the light in sections, as needed. For this purpose, the light guide 11a-11l has short sections and long sections. For example, the light guide 11a-11l can emit light in such a way that it and optionally in addition the assigned fin is illuminated completely across the long section and thus forms and/or displays the minute hand and/or seconds hand. In contrast, the hour hand can be displayed in response to illumination of the short section in sections.

The control of the illumination or of the light feed, respectively, takes place by the control device 10, which may for example be embodied as microcontroller While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A ventilation nozzle arrangement for a cockpit of a vehicle comprising:
a ventilation nozzle including a central hub and an outer ring for ventilating the vehicle by an airflow;
twelve equiangularly spaced fins radially extending from the central hub and terminating at the outer ring between which the airflow escapes in a ventilation direction, each of the twelve fins having a light-permeable material defining a visible edge when viewed in a direction opposite the ventilation direction, wherein the twelve fins correspond to a clock face;
a first light-emitting diode array having twelve first light-emitting diodes arranged relative to one another at an angle of 30 degrees, wherein one of the twelve first light-emitting diodes is associated with one of the twelve fins;

a second light-emitting diode array having twelve second light-emitting diodes arranged relative to one another at an angle of 30 degrees, one of the twelve second light-emitting diodes is associated with one of the twelve fins; and a control device configured to operate the first and second light-emitting diode arrays such that one of the first light-emitting diodes in the first light-emitting diode array selectively illuminates one visible edge on the twelve fins and of the second light-emitting diodes of the second light-emitting diode array selectively illuminates one of the visible edges on the twelve fins for providing a time display on the ventilation nozzle.

2. A ventilation nozzle arrangement for a cockpit of a vehicle comprising:

a ventilation nozzle for ventilating the vehicle by an airflow;

a plurality of light permeable fins arranged in the ventilation nozzle between which an airflow escapes in a ventilation direction;

an illuminating device for illuminating at least one of the plurality of fins comprising a first light-emitting diode array having a plurality of first light-emitting diodes and a second light-emitting diode array having a plurality of second light-emitting diodes; and a controller configured to selectively illuminate at least one of the first light-emitting diodes in the first light-emitting diode array and at least one of the second light-emitting diodes of the second light-emitting diode array, wherein the control device is configured to selectively illuminate exactly one of the first light-emitting diodes of the first light-emitting diode array and exactly one of the second light-emitting diodes of the second light-emitting diode array for illuminating at least one of the fins to provide a time display.

3. A ventilation nozzle arrangement for a cockpit of a vehicle comprising:

a ventilation nozzle having an outer ring and a plurality of fins radially extending across the outer ring between which an airflow escapes in a ventilation direction, each of the plurality of fins having a light-permeable material defining a visible edge when viewed in a direction opposite the ventilation direction;

a light emitting ring operably coupled to the light-permeable material to illuminate the visible edges of the fins; and a controller configured to operate the light emitting ring for illuminating the visible edges of the fins.

4. The ventilation nozzle arrangement according to claim 3, wherein the light-permeable material comprises a light guide operably coupled to the light emitting ring for selectively illuminating the visible edges of the fins.

5. The ventilation nozzle arrangement according to claim 3, wherein the ventilation nozzle further comprises a central hub, wherein the plurality of fins are equiangularly spaced and radially extend from the central hub and terminate at the outer ring.

6. The ventilation nozzle arrangement according to claim 5, wherein the controller is further configured to operate the light emitting ring for selectively illuminating the visible edges of the fins such that less than all of the plurality of visible edges are illuminated to provide a dial display.

7. The ventilation nozzle arrangement according to claim 5, wherein the light emitting ring comprises a first light emitting array configured to selectively illuminate a first section of the light-permeable material and a second light emitting array configured to selectively illuminate a second section of light-permeable material, wherein the first section is radially spaced with respect to the second section.

8. The ventilation nozzle arrangement according to claim 3, wherein the plurality of fins consist of twelve fins.

9. The ventilation nozzle arrangement according to claim 8, wherein the twelve fins correspond to a clock face having twelve hour units and/or twelve five-minute units for simulating a clock face.

10. The ventilation nozzle arrangement according to claim 3, wherein the light emitting ring comprises a first light-emitting diode array having a plurality of first light-emitting diodes and a second light-emitting diode array having a plurality of second light-emitting diodes.

11. The ventilation nozzle arrangement according to claim 10, wherein the first light-emitting diode array has a first radius and the second light-emitting diode array has a second radius that is smaller than the first radius.

12. The ventilation nozzle arrangement according to claim 11, wherein the first light-emitting diode array surrounds the plurality of fins forming a circular ring-shaped frame therefor and the second light-emitting diode array surrounds the common center.

13. The ventilation nozzle arrangement according to claim 8, wherein the light emitting ring comprises a first light-emitting diode array consisting of twelve first light-emitting diodes arranged relative to one another around the common center at an angle of 30 degrees, wherein one first light-emitting diodes is associated with one of the twelve fins, and a second light-emitting diode array consisting of twelve second light-emitting diodes arranged relative to one another around the common center at an angle of 30 degrees, wherein one second light-emitting diodes is associated with one of the twelve fins.

14. The ventilation nozzle arrangement according to claim 13, wherein each of the twelve first light-emitting diodes of the first light-emitting diode array is paired with one of the twelve second light-emitting diodes of the second light-emitting diode array to for a diode pair associated with one of the twelve fins.

15. The ventilation nozzle arrangement according to claim 10, wherein the control device is configured to selectively illuminate exactly one of the first light-emitting diodes of the first light-emitting diode array and exactly one of the second light-emitting diodes of the second light-emitting diode array for selectively illuminating visual edges of the fins to provide a time display.

* * * * *